(12) United States Patent
Ishida et al.

(10) Patent No.: US 6,714,367 B1
(45) Date of Patent: Mar. 30, 2004

(54) MASTER INFORMATION MEDIUM AND METHOD OF MASTER INFORMATION RECORDING

(75) Inventors: Tatsuaki Ishida, Osaka (JP); Hiroshi Ryonai, Osaka (JP); Nobuyuki Komura, Kyoto (JP); Keizo Miyata, Osaka (JP); Kiyokazu Tohma, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/555,583

(22) PCT Filed: Oct. 20, 1999

(86) PCT No.: PCT/JP99/05804

§ 371 (c)(1),
(2), (4) Date: Aug. 7, 2000

(87) PCT Pub. No.: WO00/26904

PCT Pub. Date: May 11, 2000

(51) Int. Cl.$^7$ .................................................. G11B 5/86
(52) U.S. Cl. ......................................................... 360/17
(58) Field of Search ................................ 360/15–17, 55, 360/135; G11B 5/86

(56) References Cited

U.S. PATENT DOCUMENTS

| | | | |
|---|---|---|---|
| 3,381,085 A | 4/1968 | Johnson et al. | 386/15 |
| 3,641,280 A | 2/1972 | Browder | 360/17 |
| 3,844,907 A | 10/1974 | Kitamoto et al. | 360/17 |
| 3,869,711 A | 3/1975 | Bernard et al. | 360/17 |
| 3,982,276 A | 9/1976 | Roos | 360/17 |
| 4,071,869 A | 1/1978 | Feierabend et al. | 360/135 |
| 4,277,806 A | 7/1981 | Jeffers et al. | 360/16 |
| 4,363,038 A | 12/1982 | Fayling | 360/17 |
| 4,422,106 A | 12/1983 | Sawazaki | 360/17 |
| 4,525,828 A | 6/1985 | Higashiyama et al. | 369/111 |
| RE32,464 E | 7/1987 | Aine | 428/622 |
| 4,725,899 A | 2/1988 | Gardne | |
| 4,911,967 A | 3/1990 | Lazzari | |
| 4,912,585 A | 3/1990 | Belser et al. | |
| 5,032,931 A | 7/1991 | Suzuki et al. | 360/17 |
| 5,049,942 A | 9/1991 | Bujese r | |

(List continued on next page.)

FOREIGN PATENT DOCUMENTS

| | | |
|---|---|---|
| EP | 0 131 985 | 1/1985 |
| EP | 0 655 734 | 5/1995 |
| EP | 915 456 | 5/1999 |

(List continued on next page.)

OTHER PUBLICATIONS

C. Denis Mee et al. *Magnetic Recording* (vol. III: Video, Audio, and Instrumentation Recording), Chapter 2, pp. 9405.

Tanaka et al., Characterization of Magnetizing Process for Pro–Embossed Servo Pattern of Plastic Hard Disks, IEEE Transaction on Magnetics, pp 4209–4211.

*Primary Examiner*—David Hudspeth
*Assistant Examiner*—Dan I Davidson
(74) *Attorney, Agent, or Firm*—Merchant & Gould, P.C. (23552)

(57) ABSTRACT

A master information carrier has a shape pattern corresponding to an information signal array to be recorded on a magnetic recording medium, and the shape pattern is provided by arraying a ferromagnetic thin film deposited on a nonmagnetic substrate surface. The ferromagnetic thin film is either a soft magnetic film or semihard magnetic film having not more than 40 kA/m coercive force in track length direction of the information signals, and residual magnetization of the ferromagnetic thin film in the track length direction of the information signals is greater than coercive force of the magnetic recording medium. As a result, a master information carrier with superior magnetic recording performance can be obtained.

15 Claims, 6 Drawing Sheets

U.S. PATENT DOCUMENTS

| | | | |
|---|---|---|---|
| 5,121,258 A | 6/1992 | Chi et al. | 360/17 |
| 5,296,995 A | 3/1994 | Yonezawa et al. | |
| 5,303,092 A | 4/1994 | Noda | 360/17 |
| 5,353,169 A | 10/1994 | Jeffers et al. | 360/16 |
| 5,426,535 A | 6/1995 | Bigelow et al. | 360/16 |
| 5,585,989 A | 12/1996 | Kuromiya et al. | |
| 5,748,421 A | 5/1998 | Taki et al. | |
| 5,898,553 A | 4/1999 | Oyanagi et al. | |
| 5,991,104 A | 11/1999 | Bonyhard | |
| 6,014,296 A | 1/2000 | Ichihara et al. | 360/135 |
| 6,088,200 A | 7/2000 | Morita | |
| 6,309,802 B1 | 10/2001 | Bar-Gadda | 430/321 |
| 6,376,083 B1 | 4/2002 | Murayama et al. | 428/425.9 |
| 6,433,944 B1 | 8/2002 | Nagao et al. | 360/16 |
| 6,469,848 B1 | 10/2002 | Hamada et al. | |
| 2002/0054442 A1 | 5/2002 | Nishikawa | 360/17 |

FOREIGN PATENT DOCUMENTS

| | | |
|---|---|---|
| EP | 1 128 363 | 8/2001 |
| GB | 2 164 483 | 3/1986 |
| JP | 49-5610 | 5/1972 |
| JP | 48-53704 | 7/1973 |
| JP | 50-60212 | 5/1975 |
| JP | 51-25723 | 8/1976 |
| JP | 55-12545 | 1/1980 |
| JP | 55-70935 | 5/1980 |
| JP | 56-7243 | 1/1981 |
| JP | 56-22219 | 3/1981 |
| JP | 56-41528 | 4/1981 |
| JP | 56-68926 | 6/1981 |
| JP | 57-8921 | 2/1982 |
| JP | 57-24032 | 2/1982 |
| JP | 57-109133 | 7/1982 |
| JP | 57-109134 | 7/1982 |
| JP | 57-138061 | 8/1982 |
| JP | 57-158004 | 9/1982 |
| JP | 57-158038 | 9/1982 |
| JP | 57-158039 | 9/1982 |
| JP | 57-158040 | 9/1982 |
| JP | 57-158041 | 9/1982 |
| JP | 58-26328 | 2/1983 |
| JP | 58-94136 | 6/1983 |
| JP | 58-94137 | 6/1983 |
| JP | 60-22733 | 2/1985 |
| JP | 60-209915 | 10/1985 |
| JP | 61-66215 | 4/1986 |
| JP | 61-190719 | 8/1986 |
| JP | 62-124622 | 6/1987 |
| JP | 62-208430 | 9/1987 |
| JP | 62-264432 | 11/1987 |
| JP | 63-811 | 1/1988 |
| JP | 63-166023 | 7/1988 |
| JP | 63-175229 | 7/1988 |
| JP | 63-183623 | 7/1988 |
| JP | 1-88921 | 4/1989 |
| JP | 64-88921 | 4/1989 |
| JP | 2-94111 | 4/1990 |
| JP | 2-98820 | 4/1990 |
| JP | 2-132630 | 5/1990 |
| JP | 2-214023 | 8/1990 |
| JP | 2-301018 | 12/1990 |
| JP | 3-256223 | 11/1991 |
| JP | 4-13220 | 1/1992 |
| JP | 4-134629 | 5/1992 |
| JP | 4-251435 | 9/1992 |
| JP | 4-251440 | 9/1992 |
| JP | 7-44858 | 2/1995 |
| JP | 7-78337 | 3/1995 |
| JP | 9-138927 | 5/1997 |
| JP | 10-40544 | 2/1998 |
| JP | 10-162360 | 6/1998 |
| JP | 10-269566 | 10/1998 |
| JP | 10-275435 | 10/1998 |
| JP | 11-25455 | 1/1999 |
| JP | 11-175973 | 7/1999 |
| JP | 2001-14667 | 1/2001 |
| WO | WO 91/16706 | 10/1991 |

MASTER INFORMATION MEDIUM AND METHOD OF MASTER INFORMATION RECORDING

TECHNICAL FIELD

This invention relates to a master information carrier used for static and areal lump-sum recording of digital information signals on a magnetic recording medium, and a magnetic recording method using the same.

BACKGROUND ART

A magnetic reading and reproducing apparatus has seen increases in recording density to achieve a small size and large capacity. Especially, in the field of a hard disk drive as a typical magnetic recording device, an areal recording density of more than 3 Gbit/in$^2$ is already available on the market. Furthermore an areal recording density of 10 Gbit/in$^2$ is expected in a few years, when the rapid technical advance is taken into consideration.

One of the primary technical factors that has enabled such high recording density is the increasing linear recording density, due to improvements of medium properties, a head-disk interface performance, and new signal processing methods such as partial response. Recently however, the rate of increase in track density exceeds considerably that of linear recording density, and thus becomes a primary factor of the increasing areal recording density. Practical use of a magneto-resistive type head, which is superior to a conventional inductive type head in reproduction output performance, has contributed to the progress in the track density. It is possible at present to read a signal from a track whose width is at most only a few microns with good S/N ratio by practical use of the magneto-resistive type head. Further it is expected that the track pitch will reach the sub-micron range in the near future along with further improvement of the head performance.

A tracking servo technique is important for the head to read a signal with high S/N ratio by scanning precisely such a narrow track. A conventional hard disk has areas that are located at predetermined angular intervals around the disk over 360 degrees and in which information such as a tracking servo signal, an address signal and a read clock signal are recorded (hereinafter, recording such signals is referred to as 'preformat'). A magnetic head can scan a track by reading such information at predetermined periods, and monitoring and correcting the head position.

The above-mentioned tracking servo signal, an address and a read clock signal are to be reference signals for the head to scan a track precisely. Therefore, precise record positions are required for these information signals. Current preformat recording into a hard disk is performed precisely by magnetic heads that are precisely position-controlled in a special servo-track recording apparatus after installing the disk into the drive.

The above-mentioned preformat recording of a servo signal, an address signal and a read clock signal using the magnetic head in such a special servo-track recording apparatus has some problems as follows.

The first problem is due to the fact that the relative movement between the head and the medium is necessary in general for recording with the magnetic head. This fact means that a substantially long period is required for preformat recording in the above-mentioned method while controlling precisely the positions of the head, using a special servo-track recording apparatus. In addition, the special servo-track recording apparatus is expensive. Thus, the cost for preformat recording is quite high.

The second problem is that due to a space between the head and a medium or due to a diffusive recording magnetic field caused by a pole shape of the recording head, the magnetic transition at track edges of the recorded preformat signals lacks steepness. In a current tracking servo technique, the head position is detected by the amount of a change in a read signal amplitude when the head misses a track. Therefore, the system requires a steep off-track performance, in which reproduced read signal amplitude changes sharply as the head misses the track. The diffusive recording magnetic field is contrary to this requirement, and thus, makes it difficult to realize a precise tracking servo technique that is required for a sub-micron track recording.

In order to solve the above-mentioned problems in preformat recording with a magnetic head, the inventors disclose a new preformat recording technique in Unexamined Published Japanese Patent Application (Tokkai Hei) 10-40544. The reference discloses a master information carrier having a shape pattern corresponding to an information signal array, and the pattern is provided as an array of a ferromagnetic material deposited on a nonmagnetic substrate surface. The master information carrier surface is brought into secure contact with a magnetic recording medium surface, so that a magnetic pattern corresponding to the pattern array of the ferromagnetic material on the master information carrier is recorded on the magnetic recording medium.

According to the disclosure of Tokkai-Hei 10-40544, the ferromagnetic material composing the master information carrier surface is magnetized in a direction. Due to the recording magnetic field generated by this ferromagnetic material, a magnetization pattern corresponding to the pattern array of the ferromagnetic material of the master information carrier is recorded on a magnetic recording medium. That is, the preformat recording of a tracking servo signal, an address signal, a read clock signal and other signals is achieved by using the corresponding pattern array formed on the surface of the master information carrier.

While relative movement between the head and the medium is required for conventional linear recording with a head, Tokkai-Hei 10-40544 is characterized by a static and areal lump-sum recording that does not require relative movement between a master information carrier and a medium. As a result, the technique disclosed in Tokkai-Hei 10-40544 is generally effective for the problems related to preformat recording as follows.

First, since areal recording is carried out in Tokkai-Hei 10-40544, the time needed for the preformat recording is substantially shorter as compared to the prior art using a magnetic head. In addition, an expensive servo-track recording apparatus for precise position control of the magnetic head is not necessary. Therefore, the technique disclosed in the reference can improve the productivity of the preformat recording and reduce production costs.

Secondly, a space gap between the master information carrier and the magnetic recording medium can be minimized by bringing the surface of the master information carrier into secure contact with the surface of the magnetic recording medium, since relative movement between them is not required for the static recording. In addition, unlike the prior art using a magnetic head, a diffusive recording magnetic field caused by a pole shape of the magnetic head does not occur. Thus, the magnetic transition at track edges of the recorded preformat signal is steeper compared with the recording with a magnetic head. This further ensures precise tracking.

The magnetic recording technique disclosed in Tokkai-Hei 10-40544, however, cannot provide a structure which is maximized in view of the magnetic recording performance.

For example, in the magnetic recording technique disclosed in Tokkai-Hei 10-40544, magnetic properties of ferromagnetic materials on the master information carrier surface greatly affect the magnetic recording performance. Tokkai-Hei 10-40544 has some disclosure about the magnetic properties of the ferromagnetic materials suitable for the magnetic recording technique in the range clarified at the application. The application, however, has not clarified particularly-preferred properties that allow the best recording performance in the magnetic recording technique.

The magnetic recording technique disclosed in Tokkai-Hei 10-40544 is a new magnetic recording technique having a magnetic recording mechanism that is completely different from that of a conventional technique, and thus, it is difficult to obtain the master information carrier structure with superior magnetic recording performance and a preferred magnetic recording method by analogy with the prior art.

In the magnetic recording technique, therefore, sufficient experiments are required to clarify the magnetic recording mechanism, and early provision of a master information carrier with superior magnetic recording performance and a method of magnetic recording using the same based on the clarified mechanism are required.

DISCLOSURE OF THE INVENTION

In view of the above problems, this invention seeks to provide a master information carrier with sufficiently good magnetic recording performance, and a preferable magnetic recording method using the master information carrier.

The inventors studied energetically the magnetic recording technique focusing on the disclosure of Tokkai-Hei 10-40544 to develop the mechanism regarding the magnetic recording performance, and reached a structure of a master information carrier to obtain superior recording performance and a magnetic recording method using the same.

For the above-mentioned purposes, a master information carrier of this invention comprises a shape pattern corresponding to an information signal array to be recorded on a magnetic recording medium, which is provided by an array of a ferromagnetic thin film deposited on a nonmagnetic substrate. The ferromagnetic thin film is a soft magnetic film or a semihard magnetic film in which the coercive force in the track length direction of the information signal is not more than 40 kA/m, and the residual magnetization of the ferromagnetic thin film in the track length direction of the information signals is greater than the coercive force of the magnetic recording medium. Preferably the ferromagnetic thin film has a saturation magnetization at least three times the coercive force of the magnetic recording medium, and further preferably, it has at least 100 relative permeability in the length direction of the information track.

In a magnetic recording method using the above-mentioned master information carrier, magnetization information corresponding to an information signal array is recorded on a magnetic recording medium by bringing the master information carrier into secure contact with the magnetic recording medium surface and by applying a direct current (dc) excitation magnetic field to excite the ferromagnetic thin film, wherein the master information carrier has a shape pattern corresponding to the information signal array by arraying a ferromagnetic thin film deposited on a nonmagnetic substrate. The dc excitation magnetic field is not more than the coercive force of the magnetic recording medium, and magnetization residing in the ferromagnetic thin film after eliminating the dc excitation magnetic field is greater than the coercive force of the magnetic recording medium. The dc excitation magnetic field is preferably smaller than the saturation magnetic field of the ferromagnetic thin film.

Accordingly, this invention can provide, in a magnetic recording technique based on the disclosure of Tokkai-Hei 10-40544, a master information carrier having better magnetic recording performance and a magnetic recording method using the master information carrier.

BEST MODE FOR CARRYING OUT THE INVENTION

The following explanation concerns embodiments of master information carriers of this invention and magnetic recording methods, referring to magnetic disk media with a detailed explanation of the function relating to the magnetic recording mechanism.

Figure 1:
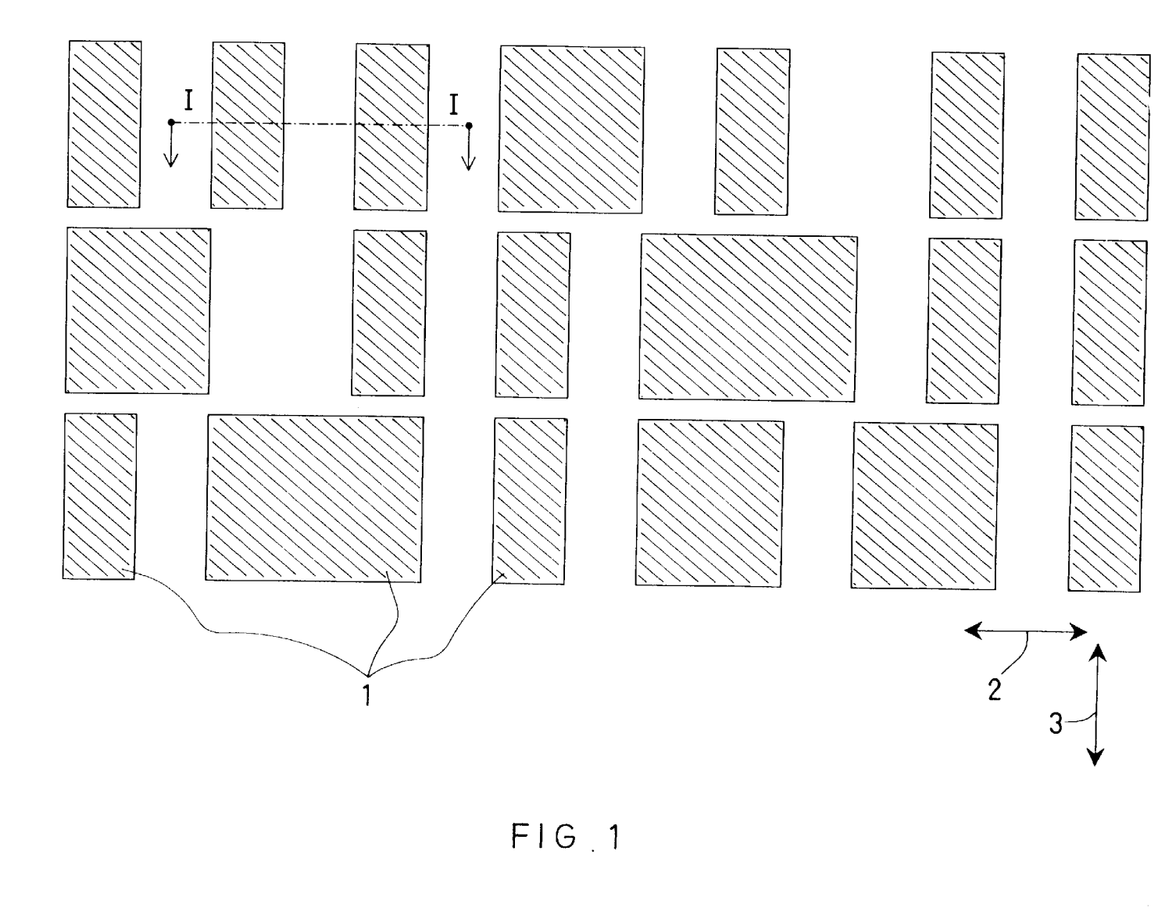
FIG. 1 is a partial exploded view to show a master information carrier surface in an example of this invention.

FIG. 1 shows an example of a surface of a master information carrier according to this invention. FIG. 1 shows an information signal array pattern in a preformat area that is disposed at a given predetermined angular distance in the circumferential direction 2 (i.e., the track length direction) of a disc-shaped nonmagnetic substrate for three tracks in the substrate radial direction 3 (i.e., track width direction). The hatched rectangular portions are composed of a ferromagnetic thin film 1. The information signal array pattern shown in FIG. 1 is formed on an actual master information carrier surface to correspond to a recording area of a magnetic disk medium on which master information signals (preformat signals) are recorded. The pattern is formed continuously or intermittently at a predetermined angular distance in the substrate circumferential direction 2 and is formed over the entire recording track area in the substrate radial direction 3. The above-mentioned information signal array pattern provided by a ferromagnetic thin film is formed by using various lithographic techniques.

The planar shapes of the ferromagnetic thin films 1 in FIG. 1 are all rectangular, but the actual shapes are not limited thereto. Various shapes can be selected according to the intended use.

Typically a nonmagnetic substrate of a master information carrier is formed to be a disc corresponding to the shape of a magnetic disk medium to be signal-recorded. The diameter of a magnetic disk medium and that of the disc-shaped nonmagnetic substrate do not necessarily coincide with each other. In some embodiments, the nonmagnetic substrate can have a diameter either larger or smaller than that of a magnetic disk medium. The disc-shaped nonmagnetic substrate of the master information carrier is not necessarily a perfect circle. An arc flat portion (referred to as an orientation flat) or a wedge-shape notch (referred to as a notch) can be formed on a part of the circumference. These portions can be used to determine directions and positions of the master information carrier in the above-mentioned lithography process or a recording process explained later.

Figure 2:
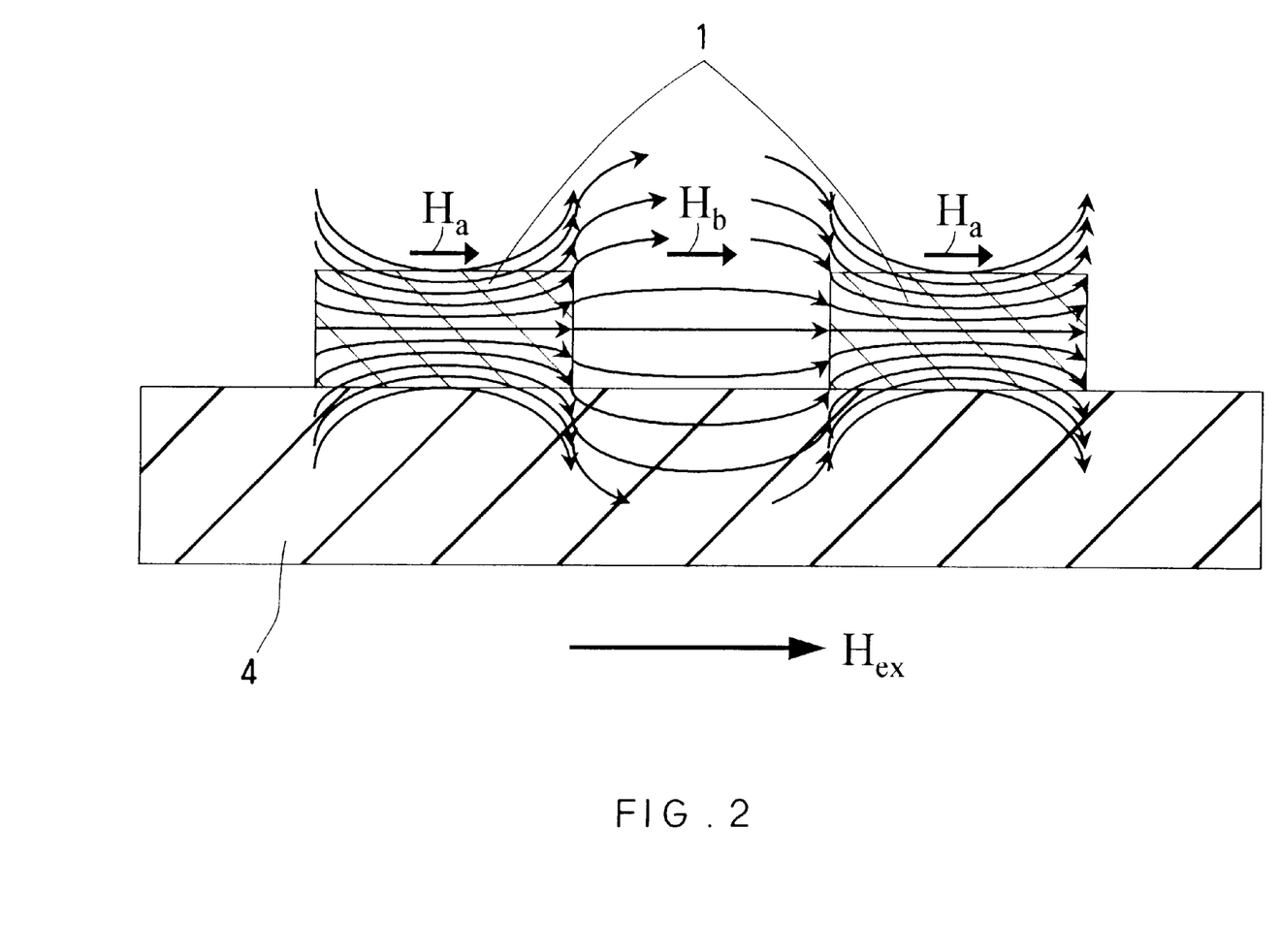
FIG. 2 is partial exploded view to show a cross-section in the substrate circumferential direction of a master information carrier in an example of this invention.
Figure 3:
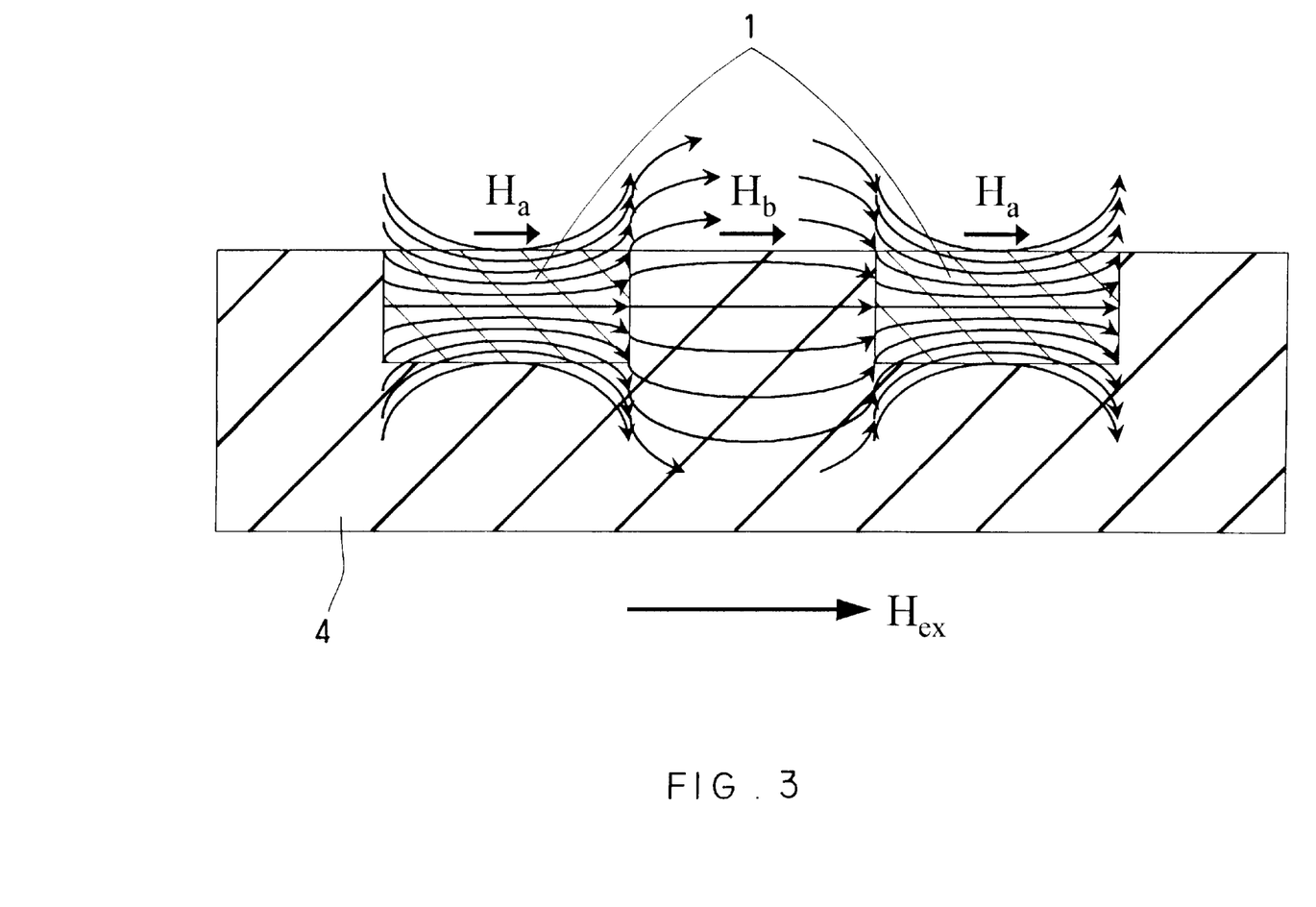
FIG. 3 is a partial exploded view to show a cross-section in the substrate circumferential direction of a master information carrier in another example of this invention.

FIGS. 2 and 3 show cross-sections of the master information carrier of this invention taken along alternate long and short dash line I—I in FIG. 1. The line I—I corresponds to the circumferential direction 2 of the disc-shaped nonmagnetic substrate. The line corresponds to a bit length direction of the digital information signal array and simultaneously, corresponds to the track length direction. A master information carrier of this invention can be formed by arraying a protruded pattern shape of a ferromagnetic thin film 1 on a surface of a nonmagnetic substrate 4 as shown in FIG. 2, or by arraying an embedded pattern shape of the ferromagnetic thin film 1 on the surface part of the nonmagnetic substrate 4 as shown in FIG. 3. From the viewpoint of durability and lifetime of the master information carrier, the structure shown in FIG. 3 is the better.

A master information carrier of this invention generates a magnetic flux flow corresponding to an array of a ferromagnetic thin film pattern by applying a dc excitation magnetic field $H_{ex}$ for exciting the ferromagnetic thin film in the bit length direction (track length direction) of the information signal array. The dc excitation magnetic field can be applied by moving either a permanent magnet or electromagnet adjacent to the master information carrier. FIGS. 2 and 3 respectively show typical flows of the magnetic flux with arrows. When a dc excitation magnetic field $H_{ex}$ is applied while the magnetic disk medium surface is in secure contact with the surface of the master information carrier, the magnetic flux leaking on the surface of the master information carrier due to the change in magnetic resistance corresponding to the ferromagnetic thin film pattern array acts as a recording magnetic field, and thus, magnetization information corresponding to the ferromagnetic thin film pattern array can be recorded on the magnetic disk medium.

Figure 4:
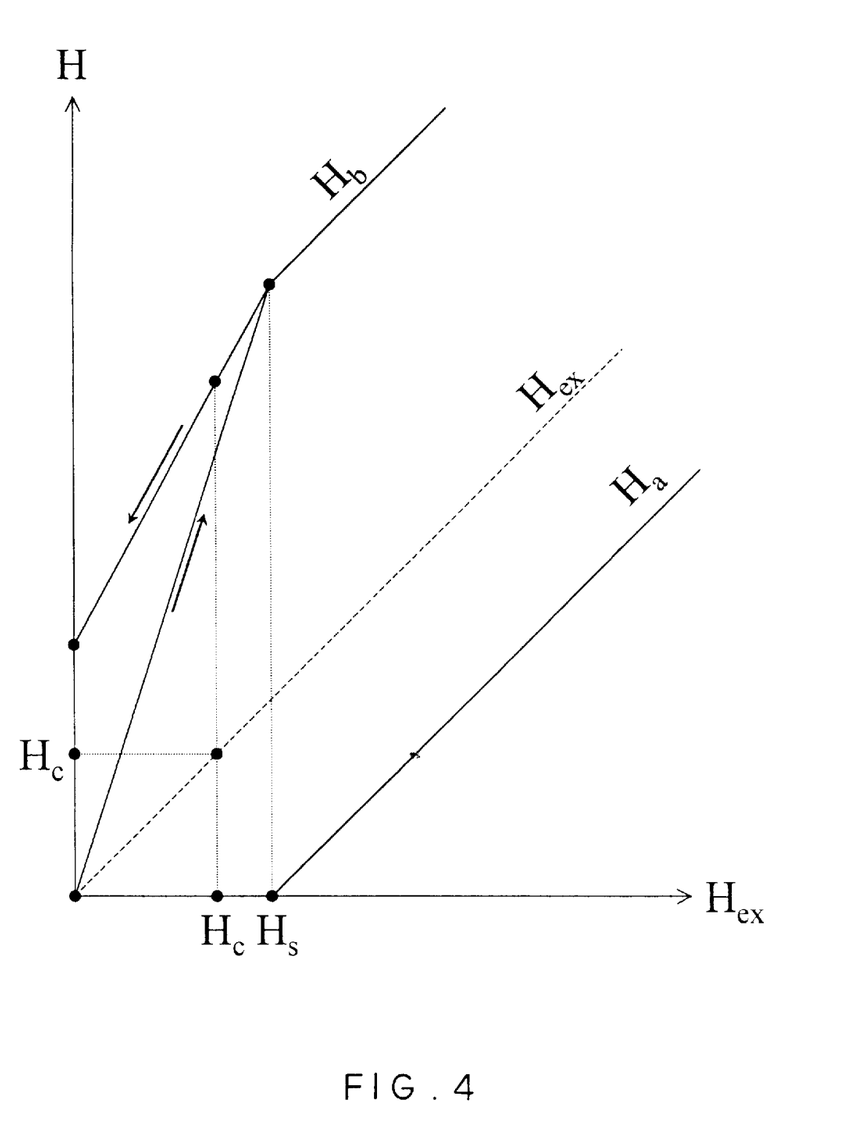
FIG. 4 is a graph to show a magnetization process for a master information carrier of this invention.

FIG. 4 is a schematic view to show the magnetization process of a master information carrier due to application of a dc excitation magnetic field $H_{ex}$ in an example of a master information carrier of this invention. FIG. 4 does not show the change in magnetization of the ferromagnetic thin film 1, but shows that $H_a$ and $H_b$ change according to the change in the dc excitation magnetic field $H_{ex}$, where $H_a$ denotes a recording magnetic field right above a portion where the ferromagnetic thin film 1 exists on the master information carrier surface while $H_b$ denotes a recording magnetic field right above a portion without the ferromagnetic thin film 1, as shown in FIGS. 2 and 3.

In FIG. 4, the ferromagnetic thin film on the master information carrier is previously degaussed to the neutral point, and thus, the initial magnetization is determined to be 0. The recording magnetic field $H_a$ right above the portion where the ferromagnetic thin film 1 exists substantially maintains 0 to a certain value of $H_s$ even if the dc excitation magnetic field $H_{ex}$ is increased. Here, $H_s$ denotes a value when the ferromagnetic thin film 1 reaches magnetic saturation, and it is called a saturation magnetic field. This behavior of $H_a$ is seen, since the ferromagnetic thin film 1 having either soft magnetic property or semihard magnetic property functions as a shielding film. Namely, the surface magnetic flux of the master information carrier due to the application of the dc excitation magnetic field $H_{ex}$ is caused by its selective passing inside the ferromagnetic thin film 1 having a high magnetic permeability, without passing the portion right above the surface of the ferromagnetic thin film 1 since the portion has lower magnetic permeability. On the other hand, when the dc excitation magnetic field $H_{ex}$ reaches $H_s$, the ferromagnetic thin film 1 reaches its magnetization saturation, and thus, no more magnetic flux can flow inside the ferromagnetic thin film 1. As a result, in a range where the dc excitation magnetic field $H_{ex}$ is greater than $H_s$, $H_a$ will be increased according only to the increase of the dc excitation magnetic field $H_{ex}$. The change of $H_a$ in a case of decreasing dc excitation magnetic field $H_{ex}$ is reversible to the change where the dc excitation magnetic field $H_{ex}$ is increased.

The recording magnetic field $H_b$ right above the portion without the ferromagnetic thin film 1 is increased rapidly as the dc excitation magnetic field $H_{ex}$ is increased, since the ferromagnetic thin film 1 is magnetized by the application of the dc excitation magnetic field $H_{ex}$ and the magnetic flux leaking from the edges is increased rapidly. When the dc excitation magnetic field $H_{ex}$ reaches $H_s$, $H_b$ increase due to spontaneous magnetization of the ferromagnetic thin film 1 does not occur any more, and thus, $H_b$ will be increased according only to the increase of the dc excitation magnetic field $H_{ex}$. When the dc excitation magnetic field $H_{ex}$ is decreased, $H_b$'s change is not reversible unlike $H_a$, and the value does not become 0 even if the dc excitation magnetic field $H_{ex}$ is returned to 0. This phenomenon is caused by the fact that the magnetization process with applying the dc excitation magnetic field $H_{ex}$ has hysteresis. $H_b$'s value when the dc excitation magnetic field $H_{ex}$ is returned to 0 varies corresponding to the value of the residual magnetization $M_r$ of the ferromagnetic thin film.

When the master information carrier surface of this invention characterized in the magnetization process is brought into secure contact with the surface of a magnetic disk medium surface and a dc excitation magnetic field $H_{ex}$ of a proper value (e.g., $H_c$ value shown in FIG. 4) is applied, the recording magnetic field $H_a$ right above the portion where the ferromagnetic thin film exists is 0 or an extremely small value while only the recording magnetic field $H_b$ right above the portion without the ferromagnetic thin film can be increased selectively further greater than the coercive force $H_c$ of the magnetic disk medium. As a result, a saturation magnetization reversal can be generated on the magnetic disk medium only right above the portion without the ferromagnetic thin film by using the recording magnetic field $H_b$, without providing a magnetization change right above the portion where the ferromagnetic thin film exists, and thus, signals corresponding to the pattern array of the ferromagnetic thin film are recorded. In this case, it is more preferable that the magnetic disk medium is uniformly dc-erased in the circumferential direction by using a dc magnetic field with a reversed polarity to $H_b$ before bringing the master information carrier surface into secure contact with the magnetic disk surface, so that the portion right above the ferromagnetic thin film and the portion without the ferromagnetic thin film can be saturation-recorded with a polarity reversed to each other.

The ferromagnetic thin film 1 should function as a shielding film in order to provide the above-mentioned recording mechanism with the master information carrier of this invention and to obtain sufficient recording performance.

Therefore, hard magnetic materials for magnetic disk media or the like are not used preferably for the ferromagnetic thin film 1. The inventors have found that the above-mentioned magnetic recording mechanism can be provided by using a ferromagnetic thin film having either soft magnetic property or semihard magnetic property with a coercive force of about 40 kA/m or less in the substrate circumferential direction.

In the magnetic recording method of this invention, $H_b$ is required to be greater than the magnetic disk medium coercive force $H_c$ at the applied $H_{ex}$ value when recording is carried out. As mentioned above, the recording magnetic field $H_b$ is generated due to the spontaneous magnetization of the ferromagnetic thin film, so the ferromagnetic thin film should have a saturation magnetization $M_s$ that is sufficiently greater than the coercive force $H_c$ of the magnetic disk medium.

Also in the magnetic recording method of this invention, $H_b$ is required to be greater than the coercive force $H_c$ of the magnetic disk medium to be signal-recorded when $H_{ex}$ is returned to 0 so that good magnetic recording properties can be obtained. As mentioned above, $H_b$ value with $H_{ex}$ returned to 0 varies according to the value of the residual magnetization $M_r$. For a soft magnetic film or semihard magnetic film, in general, the residual magnetization $M_r$ is increased as the coercive force value is high. So the above requirement indicates that at least a certain level of coercive force is necessary for the ferromagnetic thin film 1 to provide a residual magnetization $M_r$ that is greater than the coercive force $H_c$ of the magnetic disk medium.

A process for recording on a magnetic disk medium is completed by detaching the master information carrier from the surface of the magnetic disk medium after returning the dc excitation magnetic field $H_{ex}$ to 0. If the magnetization of the ferromagnetic thin film 1 fluctuates due to any unexpectedly-disturbed magnetic fields other than $H_{ex}$, signal recording may not be completed properly since the magnetic disk medium is re-recorded or partially demagnetized. If the value of $H_b$ is determined to be greater than the coercive force $H_c$ of the magnetic disk medium when $H_{ex}$ is returned to 0, the master information carrier can provide a stable magnetization to the magnetic disk medium until the master information carrier itself is detached from the magnetic disk medium surface after the dc excitation magnetic field is returned to 0. As a result, signal recording can be completed properly without causing the above-identified re-recording or partial demagnetization.

To complete the recording process properly as mentioned above, in a ferromagnetic thin film composing a master information carrier of this invention, the residual magnetization $M_r$ is made to be at least as great as the coercive force $H_c$ of the magnetic disk medium, by providing at least a certain level of coercive force. For example, when the coercive force $H_c$ of the magnetic disk medium to be signal-recorded is 200 kA/m, the ferromagnetic material is prepared to have a certain level of coercive force to provide at least 200 kA/m residual magnetization $M_r$. In this case, it should be noted that the coercive force is determined properly in the range not exceeding 40 kA/m so that the ferromagnetic thin film maintains its function as a shielding film.

The dc excitation magnetic field $H_{ex}$ to be applied in the magnetic recording method of this invention is determined to be not more than the coercive force $H_c$ of a magnetic disk medium. In the magnetic recording method of this invention, the dc excitation magnetic field $H_{ex}$ can be applied essentially only in the vicinity of the ferromagnetic thin film 1 composing the master information carrier. In a general application using a permanent magnet or electromagnet, however, such a partial application of dc excitation magnetic field is difficult, and thus, such a dc excitation magnetic field is uniformly applied to a large area comprising the ferromagnetic thin film 1, the magnetic layer of the magnetic disk medium, and the substrates on which the layer and film are deposited.

Since some pattern shapes of the ferromagnetic thin film cannot provide a sufficient shielding effect, a certain recording magnetic field may be applied partially to the magnetic layer of the magnetic disk medium even right above the portion where the ferromagnetic thin film exists. In such a case, when the dc excitation magnetic field $H_{ex}$ is made greater than the coercive force $H_c$ of the magnetic disk medium, the disk magnetic layer that is previously dc-erased may be partially demagnetized or magnetization-reversed even right above the portion where the ferromagnetic thin film portion exists.

For example, when the shielding effect of the ferromagnetic thin film is insufficient for the thickness of the disk magnetic layer, it is difficult to provide the shielding effect to the depth (substrate side) of the disk magnetic layer. In this case, the depth of the disk magnetic layer is treated directly with a dc excitation magnetic field, and thus, partial demagnetization or magnetization reversal occurs inevitably even right above the portion where the ferromagnetic thin film exists.

Generally a magnetic disk medium has a substrate provided with magnetic layers on both surfaces to allow signal recording on the respective sides. However, when signals are recorded on a first side by using the magnetic recording method of this invention, it is difficult to provide a shielding effect of the ferromagnetic thin film to the magnetic layer of the second side. In such a case, a sufficient shielding effect can be provided to both the magnetic layers by bringing a second master information carrier provided with a certain information signal pattern into secure contact with the second side when signals are recorded on the first side. In some embodiments, however, recording by bringing master information carriers into secure contact with both the surfaces of the magnetic disk medium is difficult due to the structure of the signal-recording apparatus, and in some cases, a certain demagnetization or magnetization reversal is inevitable for the magnetic layer at the second side with which the master information carrier is not brought into secure contact.

From the viewpoint of preventing partial demagnetization or magnetization reversal caused by the insufficient shielding effect, the dc excitation magnetic field $H_{ex}$ should be in the range not exceeding the coercive force $H_c$ of the magnetic disk medium. The master information carrier preferably has properties to generate enough $H_b$ with a dc excitation magnetic field of this range.

For the ferromagnetic thin film materials having preferable magnetic properties described above, for example, a Co film, an Fe film, an Ni—Fe alloy film or the like, can be used. In an example, a Co film deposited by sputtering was used to record on a magnetic disk medium having 180 kA/m coercive force by applying 120 kA/m dc excitation magnetic field, in which extremely good recording properties were found. The saturation magnetization $M_s$ of the Co film used as the ferromagnetic thin film is estimated to be about 1400 kA/m, while the residual magnetization $M_r$ is estimated to be about 1100 kA/m, which is sufficient when compared to the coercive force of the magnetic disk medium.

Figure 5:
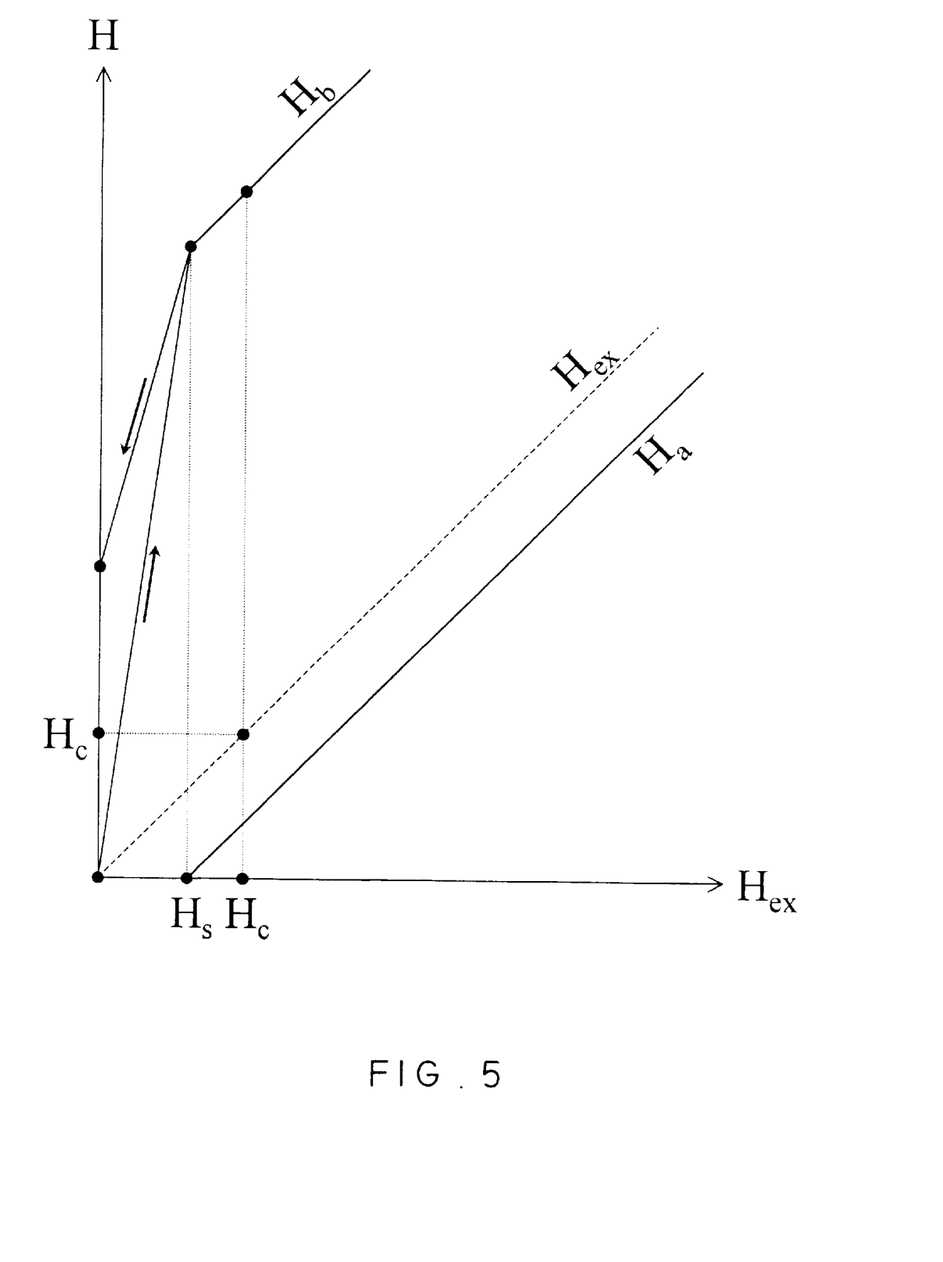
FIG. 5 is a graph to show another magnetization process for a master information carrier of this invention.

FIG. 5 is a schematic view to show the magnetization process of another master information carrier according to application of a dc excitation magnetic field $H_{ex}$ as in FIG. 4.

In the example shown in FIG. 5, unlike the example in FIG. 4, $H_s$ is smaller than $H_c$. In this case, recording with excellent signal quality can be provided by setting the dc excitation magnetic field $H_{ex}$ to be in the range from $H_s$ to $H_c$, but because of the increase of $H_a$ as a result of magnetization saturation of the ferromagnetic thin film, demagnetization may occur on the previously dc-erased disk magnetic layer right above the portion where the ferromagnetic thin film exists. Even if the $H_a$ is sufficiently small not to cause demagnetization, the magnetization saturation of the ferromagnetic thin film reduces gradient of the recording magnetic field $H_b$ at the border of the portion with the ferromagnetic thin film and the portion without the ferromagnetic thin film, and thus, magnetic transition width is increased in the magnetization pattern recorded on the magnetic disk medium. In conclusion, the quality of the signals reproduced from the recorded magnetized pattern needs further improvement.

Therefore, when characteristics of the magnetization process as shown in FIG. 5 are observed, the dc excitation magnetic field $H_{ex}$ is preferably not more than the coercive force $H_c$ of the magnetic disk medium, and also smaller than saturation magnetic field $H_s$ so that saturation of the ferromagnetic thin film can be prevented.

Figure 6:
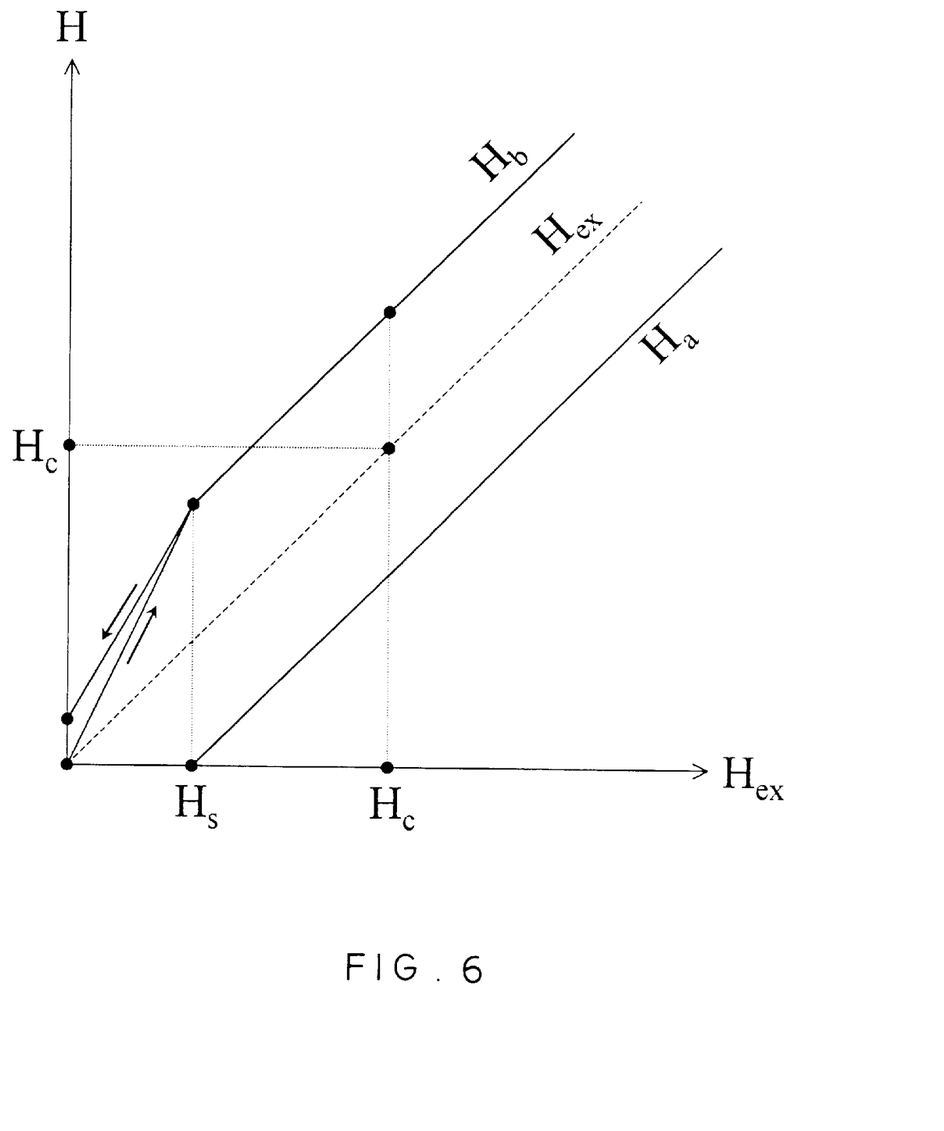
FIG. 6 is a graph to show a magnetization process for a master information carrier that is not constituted according to this invention.

FIG. 6 is a schematic view similar to FIGS. 4 and 5 to show a comparative example of a magnetization process of a master information carrier having a structure different from that of the master information carrier of this invention shown in FIGS. 4 and 5. The inventors have found that the master information carrier having the magnetization process shown in FIG. 6 is not preferable since it is considerably inferior to the master information carrier of this invention in the recording performance.

In the embodiment shown in FIG. 6, the saturation magnetization $M_s$ of the ferromagnetic thin film is considerably small when compared to a master information carrier of this invention. In FIG. 6, the recording magnetic field $H_b$ is still smaller than the coercive force $H_c$ of the magnetic disk medium even after a dc excitation magnetic field that corresponds to a saturation magnetic field $H_s$ of a ferromagnetic thin film is applied. It will be difficult for such a small recording magnetic field $H_b$ to cause magnetization reversal to a disk magnetic layer that is previously dc-erased.

Also in the master information carrier characterized with the magnetization process shown in FIG. 6, a magnetization pattern corresponding to the shape pattern provided to the surface of the master information carrier can be recorded by applying a dc excitation magnetic field $H_{ex}$ substantially equal to the coercive force $H_c$ of the magnetic disc medium. For example, when a dc excitation magnetic field $H_{ex}$ that is equal to $H_c$ is applied, $H_b$ becomes greater than $H_c$ while $H_a$ is smaller than $H_c$, as shown in FIG. 6. Therefore, when recording is carried out by using the $H_{ex}$ value on the disk magnetic layer that is previously dc-erased, magnetization patterns distinguishable in their polarities reside respectively above the portion where the ferromagnetic thin film exists and the portion without the same film. The recording mechanism, however, is completely different from that of this invention.

More specifically, the recording magnetic field $H_b$ in the recording mechanism of this invention is generated by the spontaneous magnetization of the ferromagnetic thin film, and a $H_b$ value that is sufficiently high compared to the coercive force $H_c$ of the magnetic disk medium can be obtained, and thus, it can cause saturation magnetization reversal to the magnetic disk medium. On the contrary, the recording magnetic field $H_b$ in the embodiment shown in FIG. 6 is more contributed by the dc excitation magnetic field $H_{ex}$ rather than by the spontaneous magnetization of the ferromagnetic thin film, and thus, $H_b$ cannot be raised sufficiently high compared to $H_c$. Moreover, in the recording mechanism of this invention, saturation-recording can be carried out without providing magnetization change to the magnetic layer right above the portion where the ferromagnetic thin film exists, by determining $H_a$ to be 0. On the other hand, a certain level of $H_a$ is generated inevitably in the embodiment of FIG. 6, and thus, the magnetic layer right above the portion where the ferromagnetic thin film exists is demagnetized considerably. As a result, the signals recorded in the embodiment shown in FIG. 6 will deteriorate considerably in quality compared to the embodiment of this invention.

Also as mentioned above, for obtaining good magnetic recording properties in the magnetic recording method of this invention, $H_b$ is required to be greater than the coercive force $H_c$ of the magnetic disk medium to be signal-recorded when $H_{ex}$ is returned to 0. On the other hand, in the embodiment shown in FIG. 6, $H_b$ is significantly smaller than $H_c$ when $H_{ex}$ is returned to 0. In this case, even if the saturation magnetization $M_s$ of the ferromagnetic thin film is greater sufficiently than $H_c$, the master information carrier cannot provide a stable magnetization condition continuously to the magnetic disk medium in the period that the dc excitation magnetic field $H_{ex}$ is returned to 0 and the master information carrier is detached from the magnetic disk medium surface. As a result, problems including re-recording or partial demagnetization will occur easily, and stable signal recording is difficult to carry out.

As mentioned above, in the magnetic recording method of this invention, a magnetic recording medium is provided with magnetization reversal by a recording magnetic field $H_b$ generated by the spontaneous magnetization of the ferromagnetic thin film. Since $H_b$ level depends on the spontaneous magnetization of the ferromagnetic thin film, the saturation magnetization $M_s$ of the ferromagnetic thin film is preferably greater compared to the coercive force $H_c$ of the magnetic recording medium in order to realize sufficient recording performance for the magnetic recording medium. As a result of a study by the inventors, the saturation magnetization $M_s$ of the ferromagnetic thin film is preferably at least three times the coercive force $H_c$ of the magnetic recording medium in order to obtain sufficient recording performance to allow a saturation recording in the magnetic recording method of this invention. For example, when the coercive force $H_c$ of the magnetic disk medium to be signal-recorded is 200 kA/m, sufficient recording performance to allow a reliable saturation recording can be obtained by determining the saturation magnetization $M_s$ of the ferromagnetic material to be at least 600 kA/m.

The ferromagnetic thin film should be not only high in the saturation magnetization $M_s$, but also should be magnetized rapidly over $H_c$ with the increase of $H_{ex}$. As more rapidly magnetized by $H_{ex}$ application, saturation recording can be carried out at a lower $H_{ex}$. As a result, phenomena such as above-mentioned partial demagnetization due to an insufficient shielding effect can be prevented more completely. From this point of view, preferably in a ferromagnetic thin film, relative permeability in the substrate circumferential direction of a master information carrier is decided to be at least 100. The substrate circumferential direction of a master information carrier is the direction of the bit length direction of digital information signals to be recorded on the magnetic disk medium, and the circumferential direction agrees also with the track length direction.

Magnetic anisotropy control of the ferromagnetic thin film is also important and effective to improve recording performance of a master information carrier. As mentioned above, higher magnetic permeability in the substrate circumferential direction of the master information carrier (i.e., track length direction of the magnetic disk medium) is preferred for a ferromagnetic thin film since magnetization is sped up by $H_{ex}$ application. Preferably the ferromagnetic thin film has an axis of easy magnetization in the film surface (film plane) rather than having the easy axis in the film-thickness direction (i.e., direction perpendicular to the film surface). It is further preferred that there is the axis of easy magnetization in the substrate circumferential direction in the film surface (track length direction of the magnetic disk medium) while there is an axis of hard magnetization in the substrate radial direction (track width direction of the magnetic disk).

For reference, magnetic anisotropy control is carried out oppositely in a typical ferromagnetic thin film used for an inductive magnetic head as an element to record signals similarly on a magnetic recording medium, that is, magnetic anisotropy control is carried out so that the track length direction of the magnetic recording medium becomes the axis of hard magnetization and the track width direction becomes the axis of easy magnetization. The reason is that a magnetic permeability in a very low magnetic field range such as the initial magnetic permeability is greater in the direction of the axis of hard magnetization than in the direction of the axis of easy-magnetization. In a process to reproduce signals recorded on a magnetic recording medium, a leaking magnetic field from the magnetic recording medium surface detected by a magnetic head is as small as A/m order or less, so higher magnetic permeability and higher head sensitivity can be obtained by operation in the direction of the axis of hard magnetization.

In most cases, dc excitation magnetic fields $H_{ex}$ applied in the magnetic recording method of this invention have relatively high values ranging from several 10 kA/m to 100 kA/m orders. In this magnetic field range, higher magnetic permeability is obtained by an operation in the direction of the axis of easy magnetization than in the direction of the axis of hard magnetization, and thus, recording sensitivity of the master information carrier is also improved. This is a significant example to indicate that magnetic properties preferred for a ferromagnetic thin film in the magnetic recording method of this invention cannot be explained by using analogy based on any well-known prior art.

Materials for ferromagnetic thin films used to obtain preferred recording properties by controlling magnetic anisotropy in the substrate surface include Fe-based polycrystalline alloy films, such as Fe—Al—Si, Fe—Ta—C, Fe—Hf—Al—N or the like. In the embodiment, a polycrystailine film based on Fe—Ta—N was used.

Soft magnetic films that have isotropic magnetic properties in substrate surfaces of master information carriers also can be used as ferromagnetic thin films. For example, Co-based amorphous films mainly comprising Co—Ta—Zr, Co—Nb—Zr or the like can provide high magnetic permeability with superior isotropism in substrate surfaces, so they are suitable for ferromagnetic thin film materials used for master information carriers of this invention. In one example, an amorphous film based on Co—Ta—Zr was used.

The present invention, though explained with several embodiments, can be utilized in a variety of embodiments. While the above description is focused on applications of magnetic disk media installed in hard disk drives, this invention is not limited thereto but can be applied to flexible magnetic disks to attain similar effects.

This invention is not limited to magnetic disks but can be applied to recorded information signals on magnetic recording media having various shapes such as magnetic tapes and magnetic cards. In such a case, a nonmagnetic substrate composing a master information carrier is not like a disc but formed as, for example, a tape and a sheet, to agree with the shape of magnetic recording medium. At the same time, the 'circumferential direction' in the above description is interpreted as a track length direction of information signals to be recorded while the 'radial direction' is interpreted as a track width direction, before applying the above-mentioned embodiment. As a result, these magnetic recording media, like a magnetic disk, can provide the effects of this invention.

With regard to information signals to be recorded, the description of this invention is focused on preformat signals such as a tracking servo signal, an address signal, and a read clock signal. This invention, however, is not limited thereto but can be used in principle to record various data signals and audio and video signals. In such a case, soft disk media can be copied and produced on a large scale at a low cost by using the master information carriers of this invention and the technique to record on magnetic recording media by using the master information carriers.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A master information carrier having a shape pattern corresponding to an information signal array to be recorded on a magnetic recording medium, and the shape pattern being provided by arraying a ferromagnetic thin film deposited on a nonmagnetic substrate surface;
   a residual magnetization of the ferromagnetic thin film in a track length direction of the information signal array is greater than a coercive force of the magnetic recording medium.

2. The master information carrier according to claim 1, wherein saturation magnetization of the ferromagnetic thin film is at least three times the coercive force of the magnetic recording medium.

3. The master information carrier according to claim 1, wherein relative permeability between the ferromagnetic thin film and a portion right above the ferromagnetic thin film in the track length direction of the information signal array of the ferromagnetic thin film is at least 100.

4. The master information carrier according to claim 1, wherein the ferromagnetic thin film has an axis of easy magnetization in the track length direction of the information signals and an axis of hard magnetization in a track width direction.

5. The master information carrier according to claim 4, wherein the ferromagnetic thin film is an Fe-based polycrystalline film.

6. The master information carrier according to claim 1, wherein the ferromagnetic thin film is easily magnetized in the film surface and magnetically isotropic in the film surface.

7. The master information carrier according to claim 6, wherein the ferromagnetic thin film is a Co-based amorphous film.

8. The master information carrier according to claim 1, which is used to record the information signal array on a disc-shaped magnetic disk medium;
wherein the nonmagnetic substrate is a disc-shaped substrate and the track length direction of the information signal array is a circumferential direction of the disc-shaped substrate.

9. The master information carrier according to claim 1, wherein the ferromagnetic thin film is either a soft magnetic film or a semihard magnetic film having a coercive force not more than 40 kA/m in the track length direction of the information signals.

10. A magnetic recording method to record magnetization information on a magnetic recording medium, the magnetization information corresponding to an information signal array, and the recording being carried out by bringing a master information carrier into secure contact with the magnetic recording medium and by applying a direct current excitation magnetic field to excite a ferromagnetic thin film in the master information carrier, where the master information carrier is provided with a shape pattern corresponding to the information signal array by arraying the ferromagnetic thin film deposited on a nonmagnetic substrate;
wherein magnetization residing in the ferromagnetic thin film after removal of the direct current excitation magnetic field is greater than a coercive force of the magnetic recording medium.

11. The magnetic recording method according to claim 10, wherein the applied direct current excitation magnetic field is smaller than a saturation magnetic field of the ferromagnetic thin film.

12. The magnetic recording method according to claim 10, wherein the magnetic recording medium is direct-current-erased uniformly in a track length direction of the information signal array before bringing the master information carrier into secure contact with the magnetic recording medium surface.

13. The magnetic recording method according to claim 12, wherein the magnetic recording medium is a disc-shaped magnetic disk medium, and the track length direction of the information signals is a circumferential direction of the magnetic disk medium.

14. The magnetic recording method according to claim 10, wherein the direct current excitation magnetic field is not greater than a coercive force of the magnetic recording medium.

15. A hard disk drive device comprising a magnetic recording medium recorded with magnetization information by the magnetic recording method according to claim 10.

* * * * *

UNITED STATES PATENT AND TRADEMARK OFFICE
CERTIFICATE OF CORRECTION

PATENT NO.     : 6,714,367 B1
DATED          : March 30, 2004
INVENTOR(S)    : Ishida et al.

It is certified that error appears in the above-identified patent and that said Letters Patent is hereby corrected as shown below:

<u>Title page,</u>
Insert Item -- [30] Foreign Application Priority Data

Oct. 29, 1998    (JP)    10-308812 --

Signed and Sealed this

Twenty-eighth Day of September, 2004

JON W. DUDAS
*Director of the United States Patent and Trademark Office*